US009913097B2

(12) United States Patent
Cui et al.

(10) Patent No.: US 9,913,097 B2
(45) Date of Patent: Mar. 6, 2018

(54) METHOD AND APPARATUS FOR OBTAINING LOCATION INFORMATION

(71) Applicant: Huawei Technologies Co., Ltd., Shenzhen (CN)

(72) Inventors: Jie Cui, Shenzhen (CN); Yijie Li, Shenzhen (CN); Bin Su, Shenzhen (CN); Anjian Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/586,750

(22) Filed: May 4, 2017

(65) Prior Publication Data
US 2017/0238139 A1  Aug. 17, 2017

Related U.S. Application Data

(63) Continuation of application No. PCT/CN2014/090312, filed on Nov. 5, 2014.

(51) Int. Cl.
H04W 4/02     (2009.01)
H04B 17/336   (2015.01)
(Continued)

(52) U.S. Cl.
CPC .......... H04W 4/025 (2013.01); H04B 17/318 (2015.01); H04B 17/336 (2015.01); H04W 84/042 (2013.01)

(58) Field of Classification Search
CPC .. H04W 4/025; H04W 84/042; H04B 17/318; H04B 17/336
See application file for complete search history.

(56) References Cited

U.S. PATENT DOCUMENTS 6,034,635 A * 3/2000 Gilhousen ............. H04W 64/00
                                                    342/457
6,148,211 A   11/2000 Reed et al.
(Continued)

FOREIGN PATENT DOCUMENTS

CN  102665275 A   9/2012
CN  103582117 A   2/2014
(Continued)

OTHER PUBLICATIONS

"3rd Generation Partnership Project; Technical Specification Group Radio Access Network; Evolved Universal Terrestial Radio Access (E-UTRA); Requirements for support radio resource management (Release 12)", Technical Specification 3GPP TS 36.133, V12.5.0, Sep. 2014, 877 pages.

Primary Examiner — Mehmood B Khan

(57) ABSTRACT

The present disclosure discloses a method and an apparatus for obtaining location information, and pertains to the field of mobile communications. The method includes: receiving signal features and an identity of a to-be-positioned terminal that are sent by all base stations in multiple base stations, where the signal feature of a base station includes a signal power and an additional feature, and the additional feature includes at least a base station identity of the base station and signal transmission time; determining a relative power set according to signal powers sent by the multiple base stations, where the relative power set includes a relative power between any two base stations in the multiple base stations; and determining, according to the relative power set and additional features sent by the multiple base stations, location information of a terminal corresponding to the identity of the to-be-positioned terminal.

18 Claims, 4 Drawing Sheets

(51) Int. Cl.
*H04B 17/318* (2015.01)
*H04W 84/04* (2009.01)

(56) References Cited

U.S. PATENT DOCUMENTS

| | | | |
|---|---|---|---|
| 2005/0078033 A1* | 4/2005 | Tamaki | G01S 5/0252 342/463 |
| 2005/0113090 A1* | 5/2005 | Sharony | G01S 5/0252 455/436 |
| 2005/0143092 A1 | 6/2005 | Tamaki et al. | |
| 2006/0089154 A1* | 4/2006 | Laroia | F01D 9/023 455/456.2 |
| 2009/0129291 A1* | 5/2009 | Gupta | H04W 8/26 370/254 |
| 2010/0265091 A1 | 10/2010 | Zuniga et al. | |
| 2010/0272009 A1* | 10/2010 | Cheng | H04W 52/346 370/315 |
| 2011/0069641 A1 | 3/2011 | Hall et al. | |
| 2012/0021772 A1* | 1/2012 | Drennan | H04W 4/02 455/456.3 |
| 2012/0040695 A1 | 2/2012 | Won et al. | |
| 2012/0165037 A1* | 6/2012 | Bull | G01S 5/0205 455/456.1 |
| 2012/0244884 A1 | 9/2012 | Lim et al. | |
| 2012/0252521 A1* | 10/2012 | Nagaraja | H04W 52/243 455/522 |
| 2013/0188626 A1* | 7/2013 | Lakhzouri | H04W 4/02 370/338 |
| 2013/0229931 A1* | 9/2013 | Kim | H04W 24/10 370/252 |
| 2013/0310077 A1* | 11/2013 | Siomina | H04W 4/02 455/456.2 |
| 2014/0113674 A1* | 4/2014 | Joseph | H04W 4/021 455/519 |
| 2014/0120947 A1 | 5/2014 | Siomina | |
| 2014/0177531 A1* | 6/2014 | Imamura | H04W 24/10 370/328 |
| 2015/0080013 A1* | 3/2015 | Venkatraman | H04W 64/003 455/456.1 |
| 2015/0133141 A1* | 5/2015 | Song | H04W 72/0406 455/452.2 |
| 2015/0163800 A1* | 6/2015 | Kim | H04W 72/0446 370/329 |
| 2015/0201305 A1* | 7/2015 | Edge | H04W 4/021 455/456.3 |
| 2015/0373491 A1* | 12/2015 | Lim | G01S 5/0257 455/456.1 |
| 2016/0212716 A1 | 7/2016 | Tang et al. | |
| 2016/0219528 A1* | 7/2016 | Kawasaki | H04W 76/023 |
| 2017/0013418 A1* | 1/2017 | He | H04W 4/02 |
| 2017/0123039 A1* | 5/2017 | Shin | G01S 5/0045 |
| 2017/0142665 A1* | 5/2017 | Tabet | H04W 52/241 |

FOREIGN PATENT DOCUMENTS

| | | |
|---|---|---|
| CN | 103843399 A | 6/2014 |
| EP | 2205031 A2 | 7/2010 |
| KR | 20100078997 A | 7/2010 |

* cited by examiner

METHOD AND APPARATUS FOR OBTAINING LOCATION INFORMATION

CROSS-REFERENCE TO RELATED APPLICATIONS

This application is a continuation of International Application No. PCT/CN2014/090312, filed on Nov. 5, 2014, the disclosure of which is hereby incorporated by reference in its entirety.

TECHNICAL FIELD

The present application relates to the field of mobile communications, and in particular, to a method and an apparatus for obtaining location information.

BACKGROUND

With development of communications technologies, a positioning service is widely used. When a user requests the positioning service, a server needs to obtain location information of a terminal corresponding to the user and send the obtained location information to the terminal corresponding to the user. For example, path navigation is a positioning service, and when a user requests the path navigation, a server needs to obtain location information of a terminal corresponding to the user and send the obtained location information to the terminal corresponding to the user.

Currently, a method for obtaining location information is provided in the prior art, including: sending, by a to-be-positioned terminal, a sounding reference signal and a terminal identity to multiple base stations that cover the to-be-positioned terminal; after receiving the sounding reference signal and the terminal identity that are sent by the terminal, separately calculating, by all base stations in the multiple base stations, their respective corresponding signal features according to the sounding reference signal, where the signal feature includes at least a base station identity of a base station, a signal power, and signal transmission time; sending, by all the base stations, their respective corresponding signal features and the terminal identity to a positioning server; and receiving, by the positioning server, the signal features and the terminal identity that are sent by all the base stations, combining all received signal features into a signal feature set, obtaining, according to the signal feature set and from a correspondence between a signal feature set and location information, corresponding location information, and then sending the location information to the terminal according to the terminal identity.

Before the obtaining location information, the correspondence between a signal feature set and location information is first stored in the positioning server by performing the following operations, which are specifically as follows: A person skilled in the art divides a wireless coverage area into several equal-sized areas, and determines location information corresponding to each area; then, for each of the areas, a person skilled in the art brings a measured terminal to the area, and sends, by using the measured terminal, a sounding reference signal to multiple base stations that cover the measured terminal; all base stations in the multiple base stations respectively obtain their respective corresponding signal features according to the received sounding reference signal; all base stations send their respective corresponding signal features to the positioning server; and the positioning server receives the signal features sent by all the base stations, combines all the received signal features into a signal feature set corresponding to the area, and stores the signal feature set corresponding to the area and location information corresponding to the area in the correspondence between a signal feature set and location information. Similarly, for each of other areas, a signal feature set and location information that are of each of the other areas may be stored in the positioning server according to the foregoing operations.

In a process of implementing the present disclosure, the prior art has at least the following disadvantage:

The signal power included in the signal feature is related to a transmit power of a terminal. Because transmit powers of the measured terminal and the to-be-positioned terminal are different, a signal feature corresponding to the sounding reference signal sent by the to-be-positioned terminal and a signal feature corresponding to the sounding reference signal sent by the measured terminal are extremely different. Therefore, there is a great error in obtained location information when the location information is obtained according to the signal feature corresponding to the sounding reference signal sent by the to-be-positioned terminal.

SUMMARY

To reduce an error in obtained location information, the present disclosure provides a method and an apparatus for obtaining location information. The technical solutions are as follows:

According to a first aspect, an apparatus for obtaining location information is provided, where the apparatus includes:

a first receiving module, configured to receive signal features and an identity of a to-be-positioned terminal that are sent by all base stations in multiple base stations, where the signal feature of a base station includes a signal power and an additional feature, and the additional feature includes at least a base station identity of the base station and signal transmission time;

a first determining module, configured to determine a relative power set according to signal powers sent by the multiple base stations, where the relative power set includes a relative power between any two base stations in the multiple base stations; and a second determining module, configured to determine, according to the relative power set and additional features sent by the multiple base stations, location information of a terminal corresponding to the identity of the to-be-positioned terminal.

With reference to the first aspect, in a first possible implementation manner of the first aspect, the first determining module includes:

a first calculation unit, configured to calculate a difference between a signal power sent by a first base station and a signal power sent by a second base station, where the first base station is any base station in the multiple base stations, and the second base station is any base station other than the first base station in the multiple base stations; and an adding unit, configured to determine the difference as a relative power between the first base station and the second base station, and add the relative power to the relative power set.

With reference to the first aspect, in a second possible implementation manner of the first aspect, the second determining module includes:

a first obtaining unit, configured to separately obtain, according to the relative power set and the additional features sent by the multiple base stations, positioning arrays corresponding to all relative powers included in the relative power set, so as to form a positioning array set; and a determining unit, configured to determine, according to the positioning array set and from a correspondence between a positioning array set and location information, the location information of the terminal corresponding to the identity of the to-be-positioned terminal.

With reference to the second possible implementation manner of the first aspect, in a third possible implementation manner of the first aspect, the first obtaining unit includes:

a determining subunit, configured to determine two base stations corresponding to a first relative power, where the first relative power is any relative power included in the relative power set;

a first obtaining subunit, configured to separately obtain, from the additional features sent by the multiple base stations, additional features sent by the two base stations; and a combination subunit, configured to combine the first relative power and the additional features sent by the two base stations into a positioning array corresponding to the first relative power.

With reference to the first aspect, in a fourth possible implementation manner of the first aspect, the apparatus further includes:

a first obtaining module, configured to obtain location information of a measured terminal;

a second receiving module, configured to receive signal features sent by multiple base stations, where the signal feature includes a signal power and an additional feature, and the additional feature includes at least a base station identity and signal transmission time;

a second obtaining module, configured to obtain, according to the signal features sent by the multiple base stations, a positioning array set corresponding to the measured terminal; and a storage module, configured to store the positioning array set and the location information of the measured terminal in a correspondence between a positioning array set and location information.

With reference to the fourth possible implementation manner of the first aspect, in a fifth possible implementation manner of the first aspect, the second obtaining module includes:

a second calculation unit, configured to calculate a relative power between any two base stations in the multiple base stations according to the signal powers sent by the multiple base stations, so as to form the relative power set; and a second obtaining unit, configured to separately obtain, according to the relative power set and the additional features sent by the multiple base stations, positioning arrays corresponding to all relative powers included in the relative power set, so as to form the positioning array set corresponding to the measured terminal.

With reference to the first aspect, in a sixth possible implementation manner of the first aspect, the additional feature further includes a signal-to-noise ratio; and the first determining module includes:

a selection unit, configured to select effective base stations from the multiple base stations according to signal-to-noise ratios included in the additional features sent by all the base stations in the multiple base stations; and a third calculation unit, configured to calculate a relative power between any two effective base stations in the effective base stations according to signal powers sent by the effective base stations, so as to form the relative power set.

With reference to the sixth possible implementation manner of the first aspect, in a seventh possible implementation manner of the first aspect, the selection unit includes:

a comparison subunit, configured to separately compare the signal-to-noise ratios sent by all the base stations in the multiple base stations with a preset threshold; and a first selection subunit, configured to select base stations with signal-to-noise ratios greater than the preset threshold as the effective base stations.

With reference to the sixth possible implementation manner of the first aspect, in an eighth possible implementation manner of the first aspect, the selection unit includes:

a sorting subunit, configured to sort the signal-to-noise ratios sent by all the base stations in the multiple base stations according to a preset order;

a second obtaining subunit, configured to obtain a preset quantity of maximum signal-to-noise ratios from all the sorted signal-to-noise ratios; and a second selection subunit, configured to select, from the multiple base stations, base stations corresponding to the obtained signal-to-noise ratios as the effective base stations.

According to a second aspect, a method for obtaining location information is provided, where the method includes:

receiving signal features and an identity of a to-be-positioned terminal that are sent by all base stations in multiple base stations, where the signal feature of a base station includes a signal power and an additional feature, and the additional feature includes at least a base station identity of the base station and signal transmission time;

determining a relative power set according to signal powers sent by the multiple base stations, where the relative power set includes a relative power between any two base stations in the multiple base stations; and determining, according to the relative power set and additional features sent by the multiple base stations, location information of a terminal corresponding to the identity of the to-be-positioned terminal.

With reference to the second aspect, in a first possible implementation manner of the second aspect, the determining a relative power set according to signal powers sent by the multiple base stations includes:

calculating a difference between a signal power sent by a first base station and a signal power sent by a second base station, where the first base station is any base station in the multiple base stations, and the second base station is any base station other than the first base station in the multiple base stations; and determining the difference as a relative power between the first base station and the second base station, and adding the relative power to the relative power set.

With reference to the second aspect, in a second possible implementation manner of the second aspect, the determining, according to the relative power set and additional features sent by the multiple base stations, location information of a terminal corresponding to the identity of the to-be-positioned terminal includes:

separately obtaining, according to the relative power set and the additional features sent by the multiple base stations, positioning arrays corresponding to all relative powers included in the relative power set, so as to form a positioning array set; and determining, according to the positioning array set and from a correspondence between a positioning array set and location information, the location information of the terminal corresponding to the identity of the to-be-positioned terminal.

With reference to the second possible implementation manner of the second aspect, in a third possible implementation manner of the second aspect, the separately obtaining, according to the relative power set and the additional features sent by the multiple base stations, positioning arrays corresponding to all relative powers included in the relative power set includes:

determining two base stations corresponding to a first relative power, where the first relative power is any relative power included in the relative power set;

separately obtaining, from the additional features sent by the multiple base stations, additional features sent by the two base stations; and combining the first relative power and the additional features sent by the two base stations into a positioning array corresponding to the first relative power.

With reference to the second aspect, in a fourth possible implementation manner of the second aspect, before the receiving signal features and an identity of a to-be-positioned terminal that are sent by multiple base stations, the method further includes:

obtaining location information of a measured terminal;

receiving signal features sent by multiple base stations, where the signal feature includes a signal power and an additional feature, and the additional feature includes at least a base station identity and signal transmission time;

obtaining, according to the signal features sent by the multiple base stations, a positioning array set corresponding to the measured terminal; and storing the positioning array set and the location information of the measured terminal in a correspondence between a positioning array set and location information.

With reference to the fourth possible implementation manner of the second aspect, in a fifth possible implementation manner of the second aspect, the obtaining, according to the signal features sent by the multiple base stations, a positioning array set corresponding to the measured terminal includes:

calculating a relative power between any two base stations in the multiple base stations according to signal powers sent by the multiple base stations, so as to form the relative power set; and separately obtaining, according to the relative power set and the additional features sent by the multiple base stations, positioning arrays corresponding to all relative powers included in the relative power set, so as to form the positioning array set corresponding to the measured terminal.

With reference to the second aspect, in a sixth possible implementation manner of the second aspect, the additional feature further includes a signal-to-noise ratio; and the determining a relative power set according to signal powers sent by the multiple base stations includes:

selecting effective base stations from the multiple base stations according to signal-to-noise ratios included in the additional features sent by all the base stations in the multiple base stations; and calculating a relative power between any two effective base stations in the effective base stations according to signal powers sent by the effective base stations, so as to form the relative power set.

With reference to the sixth possible implementation manner of the second aspect, in a seventh possible implementation manner of the second aspect, the selecting effective base stations from the multiple base stations according to signal-to-noise ratios included in the additional features sent by all the base stations in the multiple base stations includes:

separately comparing the signal-to-noise ratios sent by all the base stations in the multiple base stations with a preset threshold; and selecting base stations with signal-to-noise ratios greater than the preset threshold as the effective base stations.

With reference to the sixth possible implementation manner of the second aspect, in an eighth possible implementation manner of the second aspect, the selecting effective base stations from the multiple base stations according to signal-to-noise ratios included in the additional features sent by all the base stations in the multiple base stations includes:

sorting the signal-to-noise ratios sent by all the base stations in the multiple base stations according to a preset order;

obtaining a preset quantity of maximum signal-to-noise ratios from all the sorted signal-to-noise ratios; and selecting, from the multiple base stations, base stations corresponding to the obtained signal-to-noise ratios as the effective base stations.

According to a third aspect, an apparatus for obtaining location information is provided, where the apparatus includes:

a memory and a processor, configured to perform any of the method(s) described herein.

In this embodiment of the present disclosure, signal features and an identity of a to-be-positioned terminal that are sent by all base stations in multiple base stations are received, where the signal feature of a base station includes a signal power and an additional feature, and the additional feature includes at least a base station identity of the base station and signal transmission time; a relative power set is determined according to signal powers sent by the multiple base stations, where the relative power set includes a relative power between any two base stations in the multiple base stations; and location information of a terminal corresponding to the identity of the to-be-positioned terminal is determined according to the relative power set and additional features sent by the multiple base stations. The relative power set is obtained according to the signal powers sent by the multiple base stations, and the location information of the to-be-positioned terminal is obtained according to the relative power set and the additional features sent by the multiple base stations. Therefore, obtaining location information by using a relative power avoids impact caused by different terminal transmit powers, and greatly reduces an error in the obtained location information.

BRIEF DESCRIPTION OF THE DRAWINGS

FIG. 3-1 is a flowchart of a method for obtaining location information according to Embodiment 3 of the present disclosure;

FIG. 3-2 is a flowchart of a method for obtaining location information according to Embodiment 3 of the present disclosure.

DETAILED DESCRIPTION

To make the objectives, technical solutions, and advantages of the present disclosure clearer, the following further describes the embodiments of the present disclosure in detail with reference to the accompanying drawings.

Embodiment 1

Figure 1:
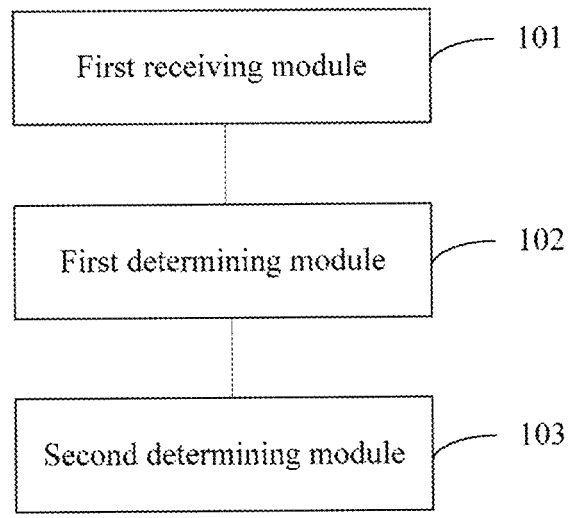
FIG. 1 is a schematic structural diagram of an apparatus for obtaining location information according to Embodiment 1 of the present disclosure.

Referring to FIG. 1, an embodiment of the present disclosure provides an apparatus for obtaining location information. The apparatus includes:

a first receiving module 101, configured to receive signal features and an identity of a to-be-positioned terminal that are sent by all base stations in multiple base stations, where the signal feature of a base station includes a signal power and an additional feature, and the additional feature includes at least a base station identity of the base station and signal transmission time;

a first determining module 102, configured to determine a relative power set according to signal powers sent by the multiple base stations, where the relative power set includes a relative power between any two base stations in the multiple base stations; and a second determining module 103, configured to determine, according to the relative power set and additional features sent by the multiple base stations, location information of a terminal corresponding to the identity of the to-be-positioned terminal.

When a user needs to use a positioning service by using a terminal, the terminal is the to-be-positioned terminal. The to-be-positioned terminal sends the identity of the to-be-positioned terminal and a sounding reference signal to multiple base stations that cover an area in which the to-be-positioned terminal is located. The to-be-positioned terminal obtains sending time at which the sounding reference signal is sent, and sends the sending time to the multiple base stations.

Each base station in the multiple base stations receives the identity of the to-be-positioned terminal, the sounding reference signal, and the sending time that are sent by the to-be-positioned terminal, obtains a signal feature according to the sounding reference signal and the sending time, and sends the identity of the to-be-positioned terminal and the obtained signal feature to a positioning server.

The signal feature includes a signal power of the sounding reference signal received by a base station, and an additional feature. The additional feature includes at least a base station identity of the base station, signal transmission time, and a signal-to-noise ratio. The signal-to-noise ratio is a ratio of a power of a normal signal received by the base station to a power of a noise signal received by the base station. Generally, a greater signal-to-noise ratio indicates less noise mixed in a signal and better signal quality.

Specifically, for each base station in the multiple base stations, the base station receives the identity of the to-be-positioned terminal, the sounding reference signal, and the sending time that are sent by the to-be-positioned terminal; calculates, according to the sounding reference signal, a signal power and a signal-to-noise ratio that are of the sounding reference signal; obtains receiving time at which the sounding reference signal is received, calculates a time difference between the receiving time and the sending time, and uses the time difference as signal transmission time of the sounding reference signal; combines a base station identity of the base station, the signal transmission time, and the signal-to-noise ratio obtained by means of calculation into an additional feature; combines the signal power obtained by means of calculation and the additional feature into a signal feature corresponding to the base station; and sends the signal feature and the identity of the to-be-positioned terminal to the positioning server. Similarly, for each base station other than the base station in the multiple base stations, a signal feature may be obtained and the obtained signal feature and the identity of the to-be-positioned terminal may be sent to the positioning server, according to the foregoing operations.

A specific method for calculating the signal power and the signal-to-noise ratio that are of the sounding reference signal is provided in the prior art. Details are not described herein.

Then, the first receiving module 101 receives the signal features and the identity of the to-be-positioned terminal that are sent by the multiple base stations.

The first determining module 102 includes:

a first calculation unit, configured to calculate a difference between a signal power sent by a first base station and a signal power sent by a second base station, where the first base station is any base station in the multiple base stations, and the second base station is any base station other than the first base station in the multiple base stations; and an adding unit, configured to determine the difference as a relative power between the first base station and the second base station, and add the relative power to the relative power set.

Before calculating a relative power between any two base stations in the multiple base stations, the first determining module 102 selects effective base stations from the multiple base stations according to the signal features sent by the multiple base stations.

The effective base station is a base station with a signal-to-noise ratio that meets a preset condition. The preset condition may be determining base stations with signal-to-noise ratios greater than a preset threshold as the effective base stations, or the preset condition is determining a preset quantity of base stations with maximum signal-to-noise ratios as the effective base stations.

Then, the first determining module 102 obtains, according to signal features sent by the effective base stations, a relative power set corresponding to the to-be-positioned terminal.

Specifically, the first determining module 102 selects any two base stations from the determined effective base stations, and combines the selected two base stations into a base station combination, so as to obtain multiple base station combinations; for any base station combination in the obtained multiple base station combinations, separately obtains, from signal features sent by two base stations included in the base station combination, signal powers sent by the two base stations and base station identities of the two base stations; and calculates a difference between the signal powers sent by the two base stations, uses the difference obtained by means of calculation as a relative power between the two base stations, and combines the relative power and the base station identities of the two base stations into an element including the relative power. Similarly, for each of other base station combinations other than the base station combination in the multiple base station combinations, an element including a relative power between two base stations included in each of the other base station combinations may be obtained according to the foregoing operations. Obtained elements including all relative powers are combined into the relative power set corresponding to the to-be-positioned terminal.

The second determining module 103 includes:

a first obtaining unit, configured to separately obtain, according to the relative power set and the additional features sent by the multiple base stations, positioning arrays corresponding to all relative powers included in the relative power set, so as to form a positioning array set; and a determining unit, configured to determine, according to the positioning array set and from a correspondence between a positioning array set and location information, the location information of the terminal corresponding to the identity of the to-be-positioned terminal.

The first obtaining unit separately obtains, according to the relative power set and the additional features sent by the multiple base stations, positioning arrays corresponding to all relative powers included in the relative power set, so as to form the positioning array set corresponding to the to-be-positioned terminal.

Specifically, the first obtaining unit obtains an element from the relative power set, obtains a relative power and two base station identities from the element, and determines two base stations corresponding to the two base station identities as two base stations corresponding to the relative power; separately obtains, from the additional features sent by the multiple base stations, additional features sent by the two base stations; and combines the relative power and the additional features sent by the two base stations into a positioning array including the relative power. Similarly, for each of other elements other than the element included in the relative power set, a positioning array including a relative power included in each of the other elements may be obtained according to the foregoing operations. All obtained positioning arrays are combined into the positioning array set corresponding to the to-be-positioned terminal.

The determining unit determines, according to the positioning array set corresponding to the to-be-positioned terminal, the location information corresponding to the to-be-positioned terminal, and sends the location information to the to-be-positioned terminal.

Specifically, the determining unit determines, from the stored correspondence between a positioning array set and location information, all positioning array sets included in the correspondence, and separately calculates a similarity between the positioning array set corresponding to the to-be-positioned terminal and all the obtained positioning array sets, so as to determine a positioning array set with a maximum similarity; determines corresponding location information according to the positioning array set and from the correspondence between a positioning array set and location information, and determines the location information as the location information corresponding to the to-be-positioned terminal; and sends the location information to the to-be-positioned terminal according to the identity of the to-be-positioned terminal.

The first obtaining unit includes:

a determining subunit, configured to determine two base stations corresponding to a first relative power, where the first relative power is any relative power included in the relative power set;

a first obtaining subunit, configured to separately obtain, from the additional features sent by the multiple base stations, additional features sent by the two base stations; and a combination subunit, configured to combine the first relative power and the additional features sent by the two base stations into a positioning array corresponding to the first relative power.

Further, the apparatus further includes:

a first obtaining module, configured to obtain location information of a measured terminal;

a second receiving module, configured to receive signal features sent by multiple base stations, where the signal feature includes a signal power and an additional feature, and the additional feature includes at least a base station identity and signal transmission time;

a second obtaining module, configured to obtain, according to the signal features sent by the multiple base stations, a positioning array set corresponding to the measured terminal; and a storage module, configured to store the positioning array set and the location information of the measured terminal in a correspondence between a positioning array set and location information.

Before the positioning service is provided for a user, a person skilled in the art divides a wireless coverage area into several equal-sized areas, and determines location information corresponding to each area. Then, for each of the areas, a person skilled in the art brings a measured terminal to the area, so as to perform positioning measurement, and sends, by using the measured terminal and to multiple base stations that cover the measured terminal, location information of the area, a sounding reference signal, and sending time at which the sounding reference signal is sent.

The wireless coverage area includes signal coverage areas of all base stations. Location information corresponding to each area may be longitude and latitude at which the central point or any vertex of each area is located, or the location information corresponding to each area may be a longitude range and a latitude range that are covered by each area. The measured terminal is generally a professional measurement device with high precision.

Similarly, for each of other areas other than the area in all the areas obtained by means of division, when the measured terminal is separately located in all the other areas, location information, a sounding reference signal, and sending time at which the sounding reference signal is sent may be sent, according to the foregoing operations, to the multiple base stations that cover the measured terminal.

All base stations in the multiple base stations separately receive the location information, the sounding reference signal, and the sending time that are sent by the measured terminal, obtain signal features according to the sounding reference signal and the sending time, and send the location information and the obtained signal features to the positioning server.

The signal feature includes a signal power of the sounding reference signal received by a base station, and an additional feature. The additional feature includes at least a base station identity and signal transmission time. The signal transmission time is time consumed for transmitting a signal from a terminal to a base station.

For each base station in the multiple base stations that cover the measured terminal, the base station receives the location information, the sounding reference signal, and the sending time that are sent by the measured terminal; calculates, according to the sounding reference signal, a signal power of the sounding reference signal; obtains receiving time at which the sounding reference signal is received, calculates a time difference between the receiving time and the sending time, and uses the time difference as signal transmission time of the sounding reference signal; combines a base station identity of the base station and the signal transmission time into an additional feature, and combines the additional feature and the signal power obtained by means of calculation into a signal feature corresponding to the base station; and sends the signal feature and the received location information to the positioning server. Similarly, for each base station other than the base station in the multiple base stations, a signal feature may be obtained and the signal feature and location information may be sent to the positioning server, according to the foregoing operations.

A specific method for calculating the signal power of the sounding reference signal is provided in the prior art. Details are not described herein.

Then, the first obtaining module obtains the location information of the measured terminal from the multiple base stations. The second receiving module receives the signal features and the location information that are sent by the multiple base stations.

The second obtaining module includes:

a second calculation unit, configured to calculate a relative power between any two base stations in the multiple base stations according to the signal powers sent by the multiple base stations, so as to form the relative power set; and a second obtaining unit, configured to separately obtain, according to the relative power set and the additional features sent by the multiple base stations, positioning arrays corresponding to all relative powers included in the relative power set, so as to form the positioning array set corresponding to the measured terminal.

The second calculation unit obtains, according to the signal features sent by the multiple base stations, a relative power set corresponding to the measured terminal.

The relative power set includes at least one element. The element includes a relative power between two base stations and base station identities of the two base stations.

Specifically, the second calculation unit selects any two base stations from the multiple base stations, and combines the selected two base stations into a base station combination, so as to obtain multiple base station combinations; for any base station combination in the obtained multiple base station combinations, separately obtains, from signal features sent by two base stations included in the base station combination, signal powers sent by the two base stations and base station identities of the two base stations; and calculates a difference between the signal powers sent by the two base stations, uses the difference obtained by means of calculation as a relative power between the two base stations, and combines the relative power and the base station identities of the two base stations into an element including the relative power. Similarly, for each of other base station combinations other than the base station combination in the multiple base station combinations, an element including a relative power between two base stations included in each of the other base station combinations may be obtained according to the foregoing operations. Obtained elements including all relative powers are combined into the relative power set corresponding to the measured terminal.

The second obtaining unit obtains an element from the relative power set, obtains a relative power and two base station identities from the element, and determines two base stations corresponding to the two base station identities as two base stations corresponding to the relative power; separately obtains, from the additional features sent by the multiple base stations, additional features sent by the two base stations; and combines the relative power and the additional features sent by the two base stations into a positioning array including the relative power. Similarly, for each of other elements other than the element included in the relative power set, a positioning array including a relative power included in each of the other elements may be obtained according to the foregoing operations. All obtained positioning arrays are combined into the positioning array set corresponding to the measured terminal.

Then, the storage module stores the positioning array set corresponding to the measured terminal and the location information of the measured terminal in a correspondence between a positioning array set and location information.

The additional feature further includes a signal-to-noise ratio.

The first determining module 102 includes:

a selection unit, configured to select effective base stations from the multiple base stations according to signal-to-noise ratios included in the additional features sent by all the base stations in the multiple base stations; and a third calculation unit, configured to calculate a relative power between any two effective base stations in the effective base stations according to signal powers sent by the effective base stations, so as to form the relative power set.

The selection unit includes:

a comparison subunit, configured to separately compare the signal-to-noise ratios sent by all the base stations in the multiple base stations with a preset threshold; and a first selection subunit, configured to select base stations with signal-to-noise ratios greater than the preset threshold as the effective base stations.

The positioning server receives the signal features and the identity of the to-be-positioned terminal that are sent by the multiple base stations; separately obtains, from the signal features sent by the multiple base stations, signal-to-noise ratios sent by all the base stations in the multiple base stations; and separately compares the signal-to-noise ratios sent by all the base stations in the multiple base stations with the preset threshold, so as to select base stations with signal-to-noise ratios greater than the preset threshold as the effective base stations.

The selection unit includes:

a sorting subunit, configured to sort the signal-to-noise ratios sent by all the base stations in the multiple base stations according to a preset order;

a second obtaining subunit, configured to obtain a preset quantity of maximum signal-to-noise ratios from all the sorted signal-to-noise ratios; and a second selection subunit, configured to select, from the multiple base stations, base stations corresponding to the obtained signal-to-noise ratios as the effective base stations.

The positioning server receives the signal features and the identity of the to-be-positioned terminal that are sent by the multiple base stations; separately obtains, from the signal features sent by the multiple base stations, signal-to-noise ratios sent by all the base stations in the multiple base stations; sorts the signal-to-noise ratios sent by all the base stations in the multiple base stations according to the preset order; obtains a preset quantity of maximum signal-to-noise ratios from all the sorted signal-to-noise ratios; and selects, from the multiple base stations, base stations corresponding to the obtained signal-to-noise ratios as the effective base stations.

The preset order may be sorting in descending order or sorting in ascending order. The signal-to-noise ratios are sorted according to the descending order, and then the preset quantity of signal-to-noise ratios are selected starting from a first signal-to-noise ratio in the sorted signal-to-noise ratios.

In this embodiment of the present disclosure, signal features and an identity of a to-be-positioned terminal that are sent by all base stations in multiple base stations are received, where the signal feature of a base station includes a signal power and an additional feature, and the additional feature includes at least a base station identity of the base station and signal transmission time; a relative power set is determined according to signal powers sent by the multiple base stations, where the relative power set includes a relative power between any two base stations in the multiple base stations; and location information of a terminal corresponding to the identity of the to-be-positioned terminal is determined according to the relative power set and additional features sent by the multiple base stations. The relative power set is obtained according to the signal powers sent by the multiple base stations, and the location information of the to-be-positioned terminal is obtained according to the relative power set and the additional features sent by the multiple base stations. Therefore, obtaining location information by using a relative power avoids impact caused by different terminal transmit powers, and greatly reduces an error in the obtained location information.

Embodiment 2

Figure 2:
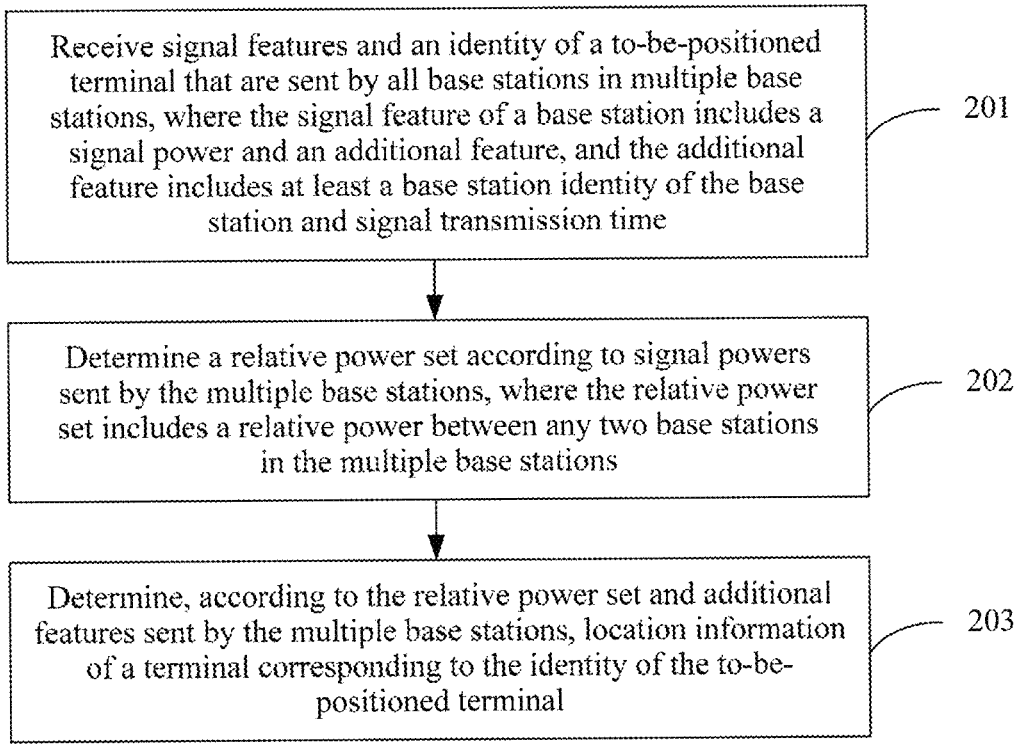
FIG. 2 is a flowchart of a method for obtaining location information according to Embodiment 2 of the present disclosure.

Referring to FIG. 2, an embodiment of the present disclosure provides a method for obtaining location information. The method includes:

Step 201: Receive signal features and an identity of a to-be-positioned terminal that are sent by all base stations in multiple base stations, where the signal feature of a base station includes a signal power and an additional feature, and the additional feature includes at least a base station identity of the base station and signal transmission time.

Step 202: Determine a relative power set according to signal powers sent by the multiple base stations, where the relative power set includes a relative power between any two base stations in the multiple base stations.

Step 203: Determine, according to the relative power set and additional features sent by the multiple base stations, location information of a terminal corresponding to the identity of the to-be-positioned terminal.

The determining a relative power set according to signal powers sent by the multiple base stations includes:

calculating a difference between a signal power sent by a first base station and a signal power sent by a second base station, where the first base station is any base station in the multiple base stations, and the second base station is any base station other than the first base station in the multiple base stations; and determining the difference as a relative power between the first base station and the second base station, and adding the relative power to the relative power set.

The determining, according to the relative power set and additional features sent by the multiple base stations, location information of a terminal corresponding to the identity of the to-be-positioned terminal includes:

separately obtaining, according to the relative power set and the additional features sent by the multiple base stations, positioning arrays corresponding to all relative powers included in the relative power set, so as to form a positioning array set; and determining, according to the positioning array set and from a correspondence between a positioning array set and location information, the location information of the terminal corresponding to the identity of the to-be-positioned terminal.

The separately obtaining, according to the relative power set and the additional features sent by the multiple base stations, positioning arrays corresponding to all relative powers included in the relative power set includes:

determining two base stations corresponding to a first relative power, where the first relative power is any relative power included in the relative power set;

separately obtaining, from the additional features sent by the multiple base stations, additional features sent by the two base stations; and combining the first relative power and the additional features sent by the two base stations into a positioning array corresponding to the first relative power.

Further, before the receiving signal features and an identity of a to-be-positioned terminal that are sent by multiple base stations, the method further includes:

obtaining location information of a measured terminal;

receiving signal features sent by multiple base stations, where the signal feature includes a signal power and an additional feature, and the additional feature includes at least a base station identity and signal transmission time;

obtaining, according to the signal features sent by the multiple base stations, a positioning array set corresponding to the measured terminal; and storing the positioning array set and the location information of the measured terminal in a correspondence between a positioning array set and location information.

The obtaining, according to the signal features sent by the multiple base stations, a positioning array set corresponding to the measured terminal includes:

calculating a relative power between any two base stations in the multiple base stations according to signal powers sent by the multiple base stations, so as to form the relative power set; and separately obtaining, according to the relative power set and the additional features sent by the multiple base stations, positioning arrays corresponding to all relative powers included in the relative power set, so as to form the positioning array set corresponding to the measured terminal.

The additional feature further includes a signal-to-noise ratio.

The determining a relative power set according to signal powers sent by the multiple base stations includes:

selecting effective base stations from the multiple base stations according to signal-to-noise ratios included in the additional features sent by all the base stations in the multiple base stations; and calculating a relative power between any two effective base stations in the effective base stations according to signal powers sent by the effective base stations, so as to form the relative power set.

The selecting effective base stations from the multiple base stations according to signal-to-noise ratios included in the additional features sent by all the base stations in the multiple base stations includes:

separately comparing the signal-to-noise ratios sent by all the base stations in the multiple base stations with a preset threshold; and selecting base stations with signal-to-noise ratios greater than the preset threshold as the effective base stations.

The selecting effective base stations from the multiple base stations according to signal-to-noise ratios included in the additional features sent by all the base stations in the multiple base stations includes:

sorting the signal-to-noise ratios sent by all the base stations in the multiple base stations according to a preset order;

obtaining a preset quantity of maximum signal-to-noise ratios from all the sorted signal-to-noise ratios; and selecting, from the multiple base stations, base stations corresponding to the obtained signal-to-noise ratios as the effective base stations.

In this embodiment of the present disclosure, signal features and an identity of a to-be-positioned terminal that are sent by all base stations in multiple base stations are received, where the signal feature of a base station includes a signal power and an additional feature, and the additional feature includes at least a base station identity of the base station and signal transmission time; a relative power set is determined according to signal powers sent by the multiple base stations, where the relative power set includes a relative power between any two base stations in the multiple base stations; and location information of a terminal corresponding to the identity of the to-be-positioned terminal is determined according to the relative power set and additional features sent by the multiple base stations. The relative power set is obtained according to the signal powers sent by the multiple base stations, and the location information of the to-be-positioned terminal is obtained according to the relative power set and the additional features sent by the multiple base stations. Therefore, obtaining location information by using a relative power avoids impact caused by different terminal transmit powers, and greatly reduces an error in the obtained location information.

Embodiment 3

Figures 1, 3:
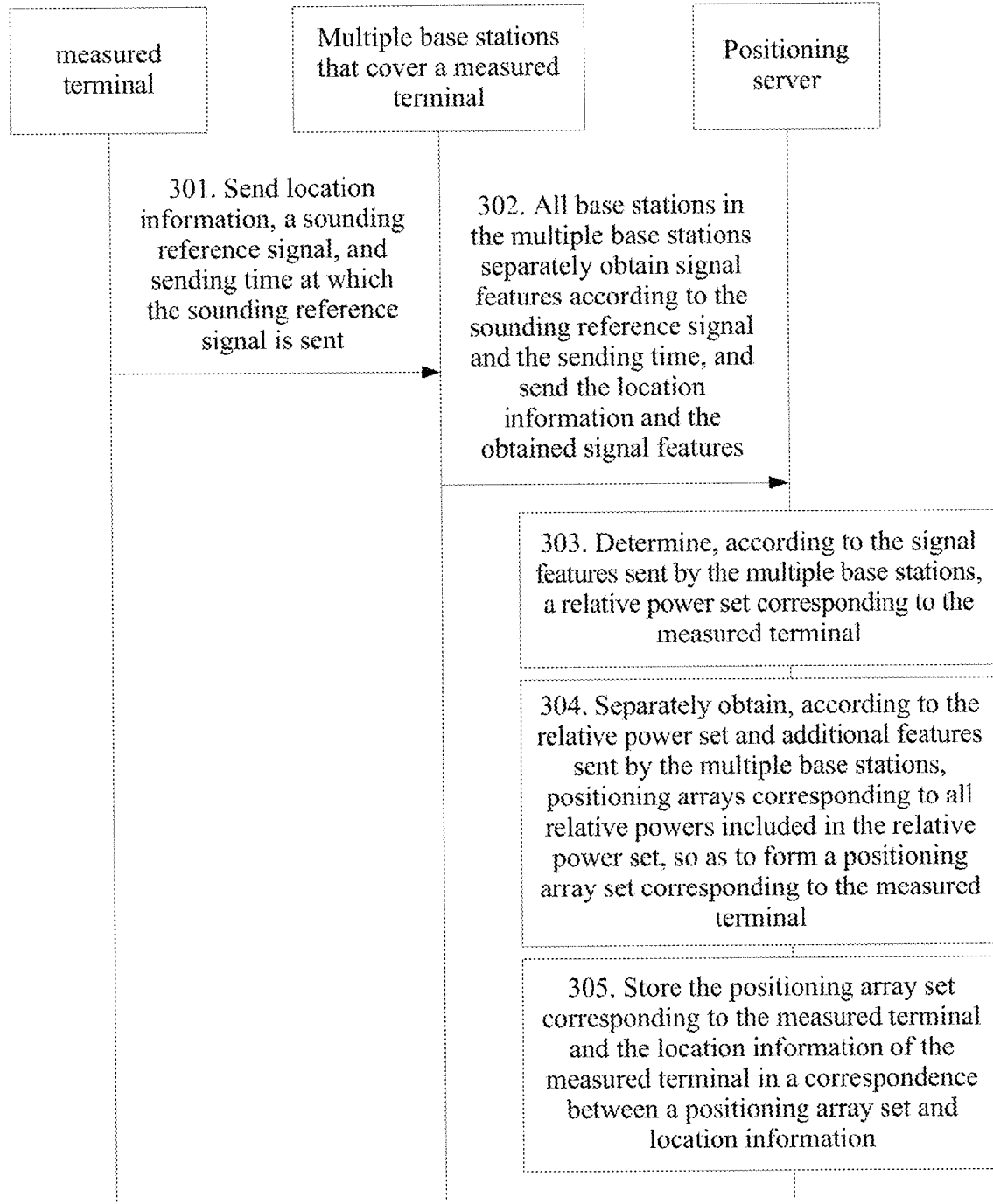
Figures 2, 3:
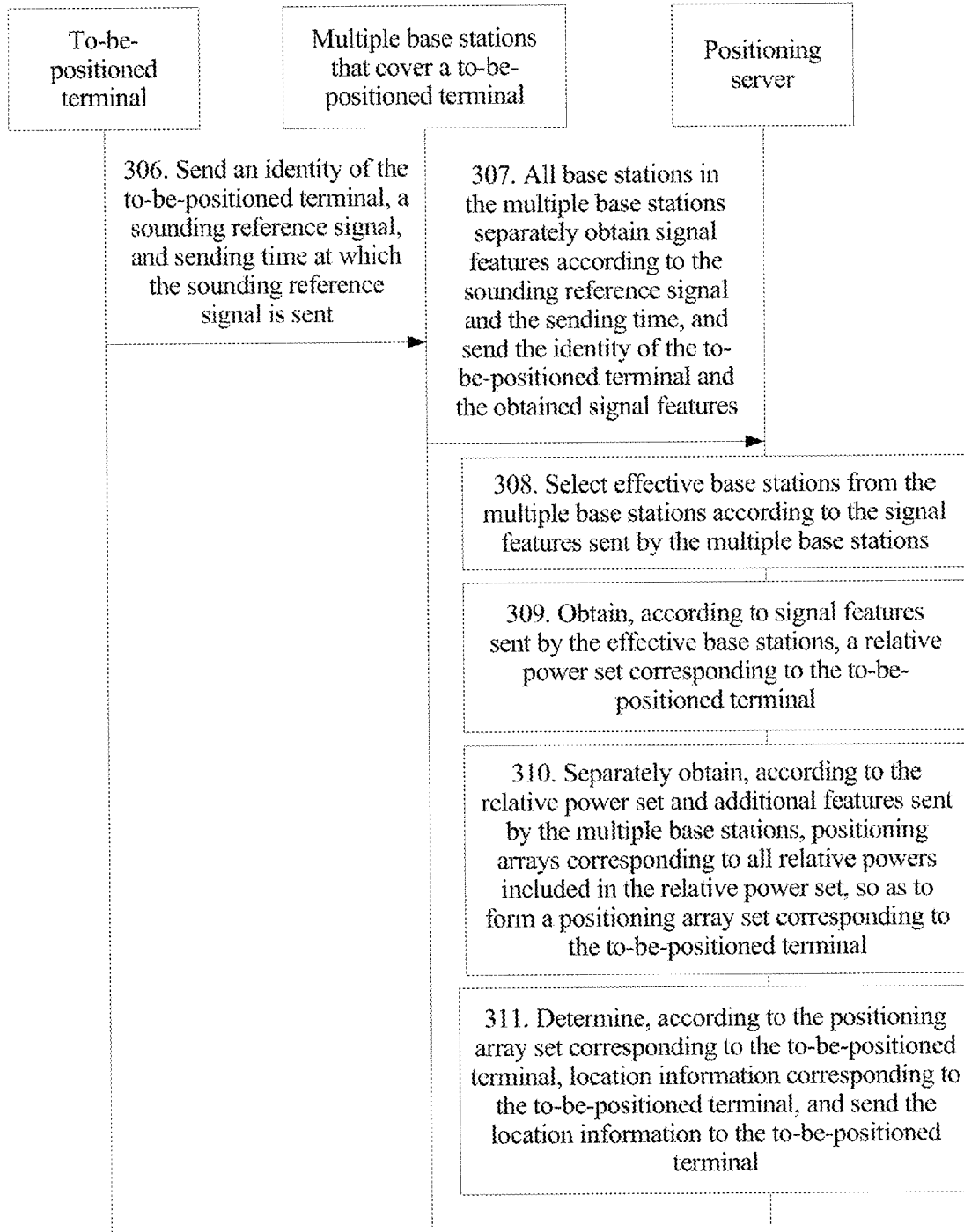

An embodiment of the present disclosure provides a method for obtaining location information. Currently, a positioning service is widely used. When a user requests the positioning service, a positioning server may obtain, by using the method provided in the embodiment of the present disclosure, location information of a terminal corresponding to the user, and send the obtained location information to the terminal corresponding to the user. The method specifically includes:

Before the positioning service is provided for the user, positioning measurement needs to be performed by performing operations in the following steps 301 to 305. Referring to FIG. 3-1, the method specifically includes:

Step 301: A measured terminal sends, to multiple base stations that cover the measured terminal, location information, a sounding reference signal, and sending time at which the sounding reference signal is sent.

Before the positioning service is provided for a user, a person skilled in the art divides a wireless coverage area into several equal-sized areas, and determines location information corresponding to each area. Then, for each of the areas, a person skilled in the art brings a measured terminal to the area, so as to perform positioning measurement, and sends, by using the measured terminal and to multiple base stations that cover the measured terminal, location information of the area, a sounding reference signal, and sending time at which the sounding reference signal is sent.

The wireless coverage area includes signal coverage areas of all base stations. Location information corresponding to each area may be longitude and latitude at which the central point or any vertex of each area is located, or the location information corresponding to each area may be a longitude range and a latitude range that are covered by each area. The measured terminal is generally a professional measurement device with high precision.

Similarly, for each of other areas other than the area in all the areas obtained by means of division, when the measured terminal is separately located in all the other areas, location information, a sounding reference signal, and sending time at which the sounding reference signal is sent may be sent, according to the foregoing operations, to the multiple base stations that cover the measured terminal.

For example, it is assumed that a person skilled in the art brings a measured terminal to an area 1, so as to perform positioning measurement; and base stations that cover an area 1 include base stations 1, 2, and 3, location information of the area 1 is (45, 50), and sending time is t0. The measured terminal sends, to the base stations 1, 2, and 3 that cover the measured terminal, the location information (45, 50), a sounding reference signal SRS1, and the sending time t0 at which the sounding reference signal SRS1 is sent.

Step 302: All base stations in the multiple base stations separately receive the location information, the sounding reference signal, and the sending time that are sent by the measured terminal, obtain signal features according to the sounding reference signal and the sending time, and send the location information and the obtained signal features to a positioning server.

The signal feature includes a signal power of the sounding reference signal received by a base station, and an additional feature. The additional feature includes at least a base station identity and signal transmission time. The signal transmission time is time consumed for transmitting a signal from a terminal to a base station.

This step is specifically as follows: For each base station in the multiple base stations that cover the measured terminal, the base station receives location information, a sounding reference signal, and sending time that are sent by the measured terminal; calculates, according to the sounding reference signal, a signal power of the sounding reference signal; obtains receiving time at which the sounding reference signal is received, calculates a time difference between the receiving time and the sending time, and uses the time difference as signal transmission time of the sounding reference signal; combines a base station identity of the base station and the signal transmission time into an additional feature, and combines the additional feature and the signal power obtained by means of calculation into a signal feature corresponding to the base station; and sends the signal feature and the received location information to the positioning server. Similarly, for each base station other than the base station in the multiple base stations, a signal feature may be obtained and the signal feature and location information may be sent to the positioning server, according to the foregoing operations.

A specific method for calculating the signal power of the sounding reference signal is provided in the prior art. Details are not described herein.

For example, the base station 1 receives the location information (45, 50), the sounding reference signal SRS1, and the sending time t0 that are sent by the measured terminal; calculates, according to the sounding reference signal SRS1, a signal power p1 of the sounding reference signal SRS1; obtains receiving time t1 at which the sounding reference signal SRS1 is received, calculates a time difference (t1−t0) between the receiving time t1 and the sending time t0, and uses the time difference (t1−t0) as signal transmission time of the sounding reference signal SRS1; combines a base station identity eNB1 of the base station 1 and the signal transmission time (t1−t0) into an additional feature F1, and combines the additional feature F1 and the signal power p1 obtained by means of calculation into a signal feature S1 corresponding to the base station 1; and sends the signal feature S1 and the received location information (45, 50) to the positioning server.

Similarly, according to the foregoing operations, a signal feature S2 obtained by the base station 2 includes a signal power p2 and an additional feature F2, and the additional feature F2 includes a base station identity eNB2 of the base station 2 and signal transmission time (t2−t0); and the base station 2 sends the signal feature S2 and the received location information (45, 50) to the positioning server. A signal feature S3 obtained by the base station 3 includes a signal power p3 and an additional feature F3, and the additional feature F3 includes a base station identity eNB3 of the base station 3 and signal transmission time (t3−t0); and the base station 3 sends the signal feature S3 and the received location information (45, 50) to the positioning server. To make descriptions clearer, the following shows, by using Table 1, signal features corresponding to all base stations.

TABLE 1

| | Signal feature | | |
| --- | --- | --- | --- |
| | | Additional feature | |
| Base station | Signal power | Base station identity | Signal transmission time |
| 1 | p1 | eNB1 | (t1-t0) |
| 2 | p2 | eNB2 | (t2-t0) |
| 3 | p3 | eNB3 | (t3-t0) |

After the location information and the signal feature are sent to the positioning server by performing the operations in steps 301 and 302, the positioning server may obtain, by performing operations in the following steps 303 and 304, a positioning array set corresponding to the measured terminal. The positioning array set includes at least one positioning array. The positioning array includes a relative power between two base stations and additional features sent by the two base stations.

Step 303: The positioning server receives the signal features and the location information that are sent by all the base stations in the multiple base stations, and determines, according to the signal features sent by the multiple base stations, a relative power set corresponding to the measured terminal.

The relative power set includes at least one element. The element includes a relative power between two base stations and base station identities of the two base stations.

This step is specifically as follows: The positioning server receives the signal features and the location information that are sent by the multiple base stations; selects any two base stations from the multiple base stations, and combines the selected two base stations into a base station combination, so as to obtain multiple base station combinations; for any base station combination in the obtained multiple base station combinations, separately obtains, from signal features sent by two base stations included in the base station combination, signal powers sent by the two base stations and base station identities of the two base stations; and calculates a difference between the signal powers sent by the two base stations, uses the difference obtained by means of calculation as a relative power between the two base stations, and combines the relative power and the base station identities of the two base stations into an element including the relative power. Similarly, for each of other base station combinations other than the base station combination in the multiple base station combinations, an element including a relative power between two base stations included in each of the other base station combinations may be obtained according to the foregoing operations. Obtained elements including all relative powers are combined into the relative power set corresponding to the measured terminal.

For example, the positioning server receives the signal feature S1 and the location information (45, 50) that are sent by the base station 1, receives the signal feature S2 and the location information (45, 50) that are sent by the base station 2, and receives the signal feature S3 and the location information (45, 50) that are sent by the base station 3; selects any two base stations from the base stations 1, 2, and 3, and when it is assumed that the base stations 1 and 2 are selected, combines the selected base stations 1 and 2 into a base station combination (1, 2), and also obtains base station combinations (1, 3) and (2, 3); separately obtains, from the signal features S1 and S2 that are sent by the base stations 1 and 2 that are included in the base station combination (1, 2), signal powers p1 and p2 that are sent by the base stations 1 and 2, and the base station identity eNB1 of the base station 1 and the base station identity eNB2 of the base station 2; calculates a difference (p1−p2) between the signal powers p1 and p2 that are sent by the base stations 1 and 2, uses the difference (p1−p2) obtained by means of calculation as a relative power between the base stations 1 and 2, and combines the relative power (p1−p2), the base station identity eNB1 of the base station 1, and the base station identity eNB2 of the base station 2 into an element [(p1−p2), eNB1, eNB2] including the relative power (p1−p2); obtains, by means of calculation and still according to the foregoing operations, an element [(p1−p3), eNB1, eNB3] including a relative power (p1−p3) between the base stations 1 and 3, and an element [(p2−p3), eNB2, eNB3] including a relative power (p2−p3) between the base stations 2 and 3; and combines the obtained elements [(p1−p2), eNB1, eNB2], [(p1−p3), eNB1, eNB3], and [(p2−p3), eNB2, eNB3] into a relative power set U1 corresponding to the measured terminal.

Step 304: The positioning server separately obtains, according to the relative power set and additional features sent by the multiple base stations, positioning arrays corresponding to all relative powers included in the relative power set, so as to form a positioning array set corresponding to the measured terminal.

Specifically, the positioning server obtains an element from the relative power set, obtains a relative power and two base station identities from the element, and determines two base stations corresponding to the two base station identities as two base stations corresponding to the relative power; separately obtains, from the additional features sent by the multiple base stations, additional features sent by the two base stations; and combines the relative power and the additional features sent by the two base stations into a positioning array including the relative power. Similarly, for each of other elements other than the element included in the relative power set, a positioning array including a relative power included in each of the other elements may be obtained according to the foregoing operations. All obtained positioning arrays are combined into the positioning array set corresponding to the measured terminal.

For example, the positioning server obtains an element from the relative power set U1, and when it is assumed that the obtained element is [(p1−p2), eNB1, eNB2], obtains, from the element [(p1−p2), eNB1, eNB2], a relative power (p1−p2) and the two base station identities eNB1 and eNB2, and determines the base stations 1 and 2 respectively corresponding to the base station identities eNB1 and eNB2 as two base stations corresponding to the relative power (p1−p2); separately obtains, from the additional features F1, F2, and F3 that are sent by the base stations 1, 2, and 3, the additional features F1 and F2 that are sent by the base stations 1 and 2; combines the relative power (p1−p2) and the additional features F1 and F2 that are sent by the base stations 1 and 2 into a positioning array [(p1−p2), F1, F2]

including the relative power (p1−p2); obtains, still according to the foregoing operations, a positioning array [(p1−p3), F1, F3] including the relative power (p1−p3), and a positioning array [(p2−p3), F2, F3] including a relative power (p2−p3); and combines the obtained positioning arrays [(p1−p2), F1, F2], [(p1−p3), F1, F3], and [(p2−p3), F2, F3] into a positioning array set V1 corresponding to the measured terminal.

Further, a positioning array may further include signal powers sent by two base stations corresponding to a relative power in the positioning array, and the like.

After the positioning array set corresponding to the measured terminal is obtained by performing the operations in steps 303 and 304, a correspondence between the positioning array set corresponding to the measured terminal and location information is stored by performing an operation in the following step 305, so as to complete positioning measurement for an area corresponding to the location information.

Step 305: The positioning server stores the positioning array set corresponding to the measured terminal and the location information of the measured terminal in a correspondence between a positioning array set and location information.

For example, the positioning server stores the positioning array set V1 corresponding to the measured terminal and the location information (45, 50) of the measured terminal in a correspondence between a positioning array set and location information, as shown in Table 2.

TABLE 2

| Positioning array set | Location information |
|---|---|
| V1 | (45, 50) |
| V3 | (60, 75) |
| . . . | . . . |

For each area obtained by dividing the wireless coverage area, a person skilled in the art brings the measured terminal to each area, so as to perform positioning measurement according to the operations in steps 301 to 305. A positioning service may be provided for a user only after positioning measurement for all areas are completed. When a to-be-positioned terminal corresponding to the user needs to be positioned, referring to FIG. 3-2, location information of the to-be-positioned terminal may be obtained by performing operations in the following steps 306 to 311.

Step 306: A to-be-positioned terminal sends, to multiple base stations that cover the to-be-positioned terminal, an identity of the to-be-positioned terminal, a sounding reference signal, and sending time at which the sounding reference signal is sent.

When a user needs to use a positioning service by using a terminal, the terminal is the to-be-positioned terminal. The to-be-positioned terminal sends the identity of the to-be-positioned terminal and a sounding reference signal to multiple base stations that cover an area in which the to-be-positioned terminal is located. The to-be-positioned terminal obtains sending time at which the sounding reference signal is sent, and sends the sending time to the multiple base stations.

For example, it is assumed that the base stations that cover the to-be-positioned terminal include base stations 1, 2, 3, and 4. The to-be-positioned terminal sends the identity phone1 of the to-be-positioned terminal and a sounding reference signal SRS2 to the base stations 1, 2, 3, and 4 that cover the to-be-positioned terminal. The to-be-positioned terminal obtains sending time t4 at which the sounding reference signal SRS2 is sent, and sends the sending time t4 to the base stations 1, 2, 3, and 4.

Step 307: All base stations in the multiple base stations receives the identity of the to-be-positioned terminal, the sounding reference signal, and the sending time that are sent by the to-be-positioned terminal, obtain signal features according to the sounding reference signal and the sending time, and send the identity of the to-be-positioned terminal and the obtained signal features to the positioning server.

The signal feature includes a signal power of the sounding reference signal received by a base station, and an additional feature. The additional feature includes at least a base station identity, signal transmission time, and a signal-to-noise ratio. The signal-to-noise ratio is a ratio of a power of a normal signal received by the base station to a power of a noise signal received by the base station. Generally, a greater signal-to-noise ratio indicates less noise mixed in a signal and better signal quality.

This step is specifically as follows: For each base station in the multiple base stations, the base station receives the identity of the to-be-positioned terminal, the sounding reference signal, and the sending time that are sent by the to-be-positioned terminal; calculates, according to the sounding reference signal, a signal power and a signal-to-noise ratio that are of the sounding reference signal; obtains receiving time at which the sounding reference signal is received, calculates a time difference between the receiving time and the sending time, and uses the time difference as signal transmission time of the sounding reference signal; combines a base station identity of the base station, the signal transmission time, and the signal-to-noise ratio obtained by means of calculation into an additional feature; combines the signal power obtained by means of calculation and the additional feature into a signal feature corresponding to the base station; and sends the signal feature and the identity of the to-be-positioned terminal to the positioning server. Similarly, for each base station other than the base station in the multiple base stations, a signal feature may be obtained and the obtained signal feature and the identity of the to-be-positioned terminal may be sent to the positioning server, according to the foregoing operations.

A specific method for calculating the signal power and the signal-to-noise ratio that are of the sounding reference signal is provided in the prior art. Details are not described herein.

For example, the base station 1 receives the identity phone1 of the to-be-positioned terminal, the sounding reference signal SRS2, and the sending time t4 that are sent by the to-be-positioned terminal; calculates, according to the sounding reference signal SRS2, a signal power p4 and a signal-to-noise ratio SNR1 that are of the sounding reference signal SRS2; obtains receiving time t5 at which the sounding reference signal SRS2 is received, calculates a time difference (t5−t4) between the receiving time t5 and the sending time t4, and uses the time difference (t5−t4) as signal transmission time of the sounding reference signal SRS2; combines a base station identity eNB1 of the base station 1, the signal transmission time (t5−t4), and the signal-to-noise ratio SNR1 obtained by means of calculation into an additional feature F4; combines the signal power p4 obtained by means of calculation and the additional feature F4 into a signal feature S4 corresponding to the base station 1; and sends the signal feature S4 and the identity phone1 of the to-be-positioned terminal to the positioning server.

Similarly, according to the foregoing operations, a signal feature S5 obtained by the base station 2 includes a signal power p5 and an additional feature F5, and the additional feature F5 includes abase station identity eNB2 of the base station 2, signal transmission time (t6−t4), and a signal-to-noise ratio SNR2; and the base station 2 sends the signal feature S5 and the identity phone1 of the to-be-positioned terminal to the positioning server. A signal feature S6 obtained by the base station 3 includes a signal power p6 and an additional feature F6, and the additional feature F6 includes a base station identity eNB3 of the base station 3, signal transmission time (t7−t4), and a signal-to-noise ratio SNR3; and the base station 3 sends the signal feature S6 and the identity phone1 of the to-be-positioned terminal to the positioning server. A signal feature S7 obtained by the base station 4 includes a signal power p7 and an additional feature F7, and the additional feature F7 includes a base station identity eNB4 of the base station 4, signal transmission time (t8−t4), and a signal-to-noise ratio SNR4; and the base station 4 sends the signal feature S7 and the identity phone1 of the to-be-positioned terminal to the positioning server. To make descriptions clearer, the following shows, by using Table 3, signal features corresponding to all base stations.

TABLE 3

| | | Signal feature | | |
| | | Additional feature | | |
| Base station | Signal power | Base station identity | Signal transmission time | Signal-to-noise ratio |
| --- | --- | --- | --- | --- |
| 1 | p4 | eNB1 | (t5-t4) | SNR1 |
| 2 | p5 | eNB2 | (t6-t4) | SNR2 |
| 3 | p6 | eNB3 | (t7-t4) | SNR3 |
| 4 | p7 | eNB4 | (t8-t4) | SNR4 |

Because a signal is interfered with by an environment in a transmission process, signal-to-noise ratios of sounding reference signals received by some base stations are extremely low, and quality of a received signal is very poor. To improve accuracy of positioning, effective base stations with received signals having relatively good quality may be determined from multiple base stations by performing operations in the following step 308.

Step 308: The positioning server receives the signal features and the identity of the to-be-positioned terminal that are sent by the multiple base stations, and selects effective base stations from the multiple base stations according to the signal features sent by the multiple base stations.

The effective base station is a base station with a signal-to-noise ratio that meets a preset condition. The preset condition may be selecting base stations with signal-to-noise ratios greater than a preset threshold as the effective base stations, or the preset condition is selecting a preset quantity of base stations with maximum signal-to-noise ratios as the effective base stations.

According to different preset conditions, this step may be implemented in the following first and second manners, which are specifically as follows:

First, the positioning server receives the signal features and the identity of the to-be-positioned terminal that are sent by the multiple base stations; separately obtains, from the signal features sent by the multiple base stations, signal-to-noise ratios sent by all the base stations in the multiple base stations; and separately compares the signal-to-noise ratios sent by all the base stations in the multiple base stations with the preset threshold, so as to select base stations with signal-to-noise ratios greater than the preset threshold as the effective base stations.

For example, the positioning server receives the signal feature S4 and the identity phone1 of the to-be-positioned terminal that are sent by the base station 1, receives the signal feature S5 and the identity phone1 of the to-be-positioned terminal that are sent by the base station 2, receives the signal feature S6 and the identity phone1 of the to-be-positioned terminal that are sent by the base station 3, and receives the signal feature S7 and the identity phone1 of the to-be-positioned terminal that are sent by the base station 4; separately obtains, from the signal features S4, S5, S6, and S7 that are sent by the base stations 1, 2, 3 and 4, the signal-to-noise ratios SNR1, SNR2, SNR3 and SNR4 that are sent by the base stations 1, 2, 3 and 4; separately compares the signal-to-noise ratios sent by the base stations 1, 2, 3, and 4 with the preset threshold; and when it is assumed that the signal-to-noise ratios of the base stations 1, 2, and 3 are all greater than the preset threshold, and the signal-to-noise ratio of the base station 4 is less than the preset threshold, selects base stations 1, 2, and 3 with signal-to-noise ratios greater than the preset threshold as the effective base stations.

Second, the positioning server receives the signal features and the identity of the to-be-positioned terminal that are sent by the multiple base stations; separately obtains, from the signal features sent by the multiple base stations, signal-to-noise ratios sent by all the base stations in the multiple base stations; sorts the signal-to-noise ratios sent by all the base stations in the multiple base stations according to a preset order; obtains a preset quantity of maximum signal-to-noise ratios from all the sorted signal-to-noise ratios; and selects, from the multiple base stations, base stations corresponding to the obtained signal-to-noise ratios as the effective base stations.

The preset order may be sorting in descending order or sorting in ascending order. The signal-to-noise ratios are sorted according to a descending order, and then the preset quantity of signal-to-noise ratios are selected starting from a first signal-to-noise ratio in the sorted signal-to-noise ratios.

For example, it is assumed that the preset order is sorting in descending order, and the preset quantity is 3. The positioning server receives the signal feature S4 and the identity phone1 of the to-be-positioned terminal that are sent by the base station 1, receives the signal feature S5 and the identity phone1 of the to-be-positioned terminal that are sent by the base station 2, receives the signal feature S6 and the identity phone1 of the to-be-positioned terminal that are sent by the base station 3, and receives the signal feature S7 and the identity phone1 of the to-be-positioned terminal that are sent by the base station 4; separately obtains, from the signal features S4, S5, S6, and S7 that are sent by the base stations 1, 2, 3 and 4, the signal-to-noise ratios SNR1, SNR2, SNR3 and SNR4 that are sent by the base stations 1, 2, 3 and 4; sorts the signal-to-noise ratios sent by the base stations 1, 2 3, and 4 according to the descending order; and when it is assumed that an order of the sorted signal-to-noise ratios is the SNR2, the SNR3, the SNR1 and the SNR4, obtains three signal-to-noise ratios starting from a first signal-to-noise ratio SNR2 in the sorted signal-to-noise ratios, that is, obtains the signal-to-noise ratios SNR2, SNR3, and SNR1, and selects, from the multiple base stations, the base stations 2, 3, and 1 that are respectively corresponding to the obtained signal-to-noise ratios SNR2, SNR3, and SNR1 as the effective base stations.

After the effective base stations are selected by performing the operations in step 308, a positioning array set corresponding to the to-be-positioned terminal may be obtained by performing operations in the following steps 309 and 310.

Step 309: The positioning server obtains, according to signal features sent by the effective base stations, a relative power set corresponding to the to-be-positioned terminal.

Specifically, the positioning server selects any two base stations from the determined effective base stations, and combines the selected two base stations into a base station combination, so as to obtain multiple base station combinations; for any base station combination in the obtained multiple base station combinations, separately obtains, from signal features sent by two base stations included in the base station combination, signal powers sent by the two base stations and base station identities of the two base stations; and calculates a difference between the signal powers sent by the two base stations, uses the difference obtained by means of calculation as a relative power between the two base stations, and combines the relative power and the base station identities of the two base stations into an element including the relative power. Similarly, for each of other base station combinations other than the base station combination in the multiple base station combinations, an element including a relative power between two base stations included in each of the other base station combinations may be obtained according to the foregoing operations. Obtained elements including all relative powers are combined into the relative power set corresponding to the to-be-positioned terminal.

For example, the positioning server selects any two base stations from the determined effective base stations 1, 2, and 3, and when it is assumed that the base stations 1 and 2 are selected, combines the selected base stations 1 and 2 into a base station combination (1, 2), and also obtains base station combinations (1, 3) and (2, 3); separately obtains, from the signal features S4 and S5 that are sent by the base stations 1 and 2 that are included in the base station combination (1, 2), signal powers p4 and p5 that are sent by the base stations 1 and 2, and the base station identity eNB1 of the base station 1 and the base station identity eNB2 of the base station 2; calculates a difference (p4−p5) between the signal powers p4 and p5 that are sent by the base stations 1 and 2, uses the difference (p4−p5) obtained by means of calculation as a relative power between the base stations 1 and 2, and combines the relative power (p4−p5), the base station identity eNB1 of the base station 1, and the base station identity eNB2 of the base station 2 into an element [(p4−p5), eNB1, eNB2] including the relative power (p4−p5); obtains, by means of calculation and still according to the foregoing operations, an element [(p4−p6), eNB1, eNB3] including a relative power (p4−p6) between the base stations 1 and 3, and an element [(p5−p6), eNB2, eNB3] including a relative power (p5−p6) between the base stations 2 and 3; and combines the obtained elements [(p4−p5), eNB1, eNB2], [(p4−p6), eNB1, eNB3], and [(p5−p6), eNB2, eNB3] into a relative power set U2 corresponding to the to-be-positioned terminal.

Step 310: The positioning server separately obtains, according to the relative power set and the additional features sent by the multiple base stations, positioning arrays corresponding to all relative powers included in the relative power set, so as to form a positioning array set corresponding to the to-be-positioned terminal.

Specifically, the positioning server obtains an element from the relative power set, obtains a relative power and two base station identities from the element, and determines two base stations corresponding to the two base station identities as two base stations corresponding to the relative power; separately obtains, from the additional features sent by the multiple base stations, additional features sent by the two base stations; and combines the relative power and the additional features sent by the two base stations into a positioning array including the relative power. Similarly, for each of other elements other than the element included in the relative power set, a positioning array including a relative power included in each of the other elements may be obtained according to the foregoing operations. All obtained positioning arrays are combined into the positioning array set corresponding to the to-be-positioned terminal.

For example, the positioning server obtains an element from the relative power set U2, and when it is assumed that the obtained element is [(p4−p5), eNB1, eNB2], obtains, from the element [(p4−p5), eNB1, eNB2], the relative power (p4−p5) and the two base station identities eNB1 and eNB2, and determines the base stations 1 and 2 respectively corresponding to the base station identities eNB1 and eNB2 as two base stations corresponding to the relative power (p4−p5); separately obtains, from the additional features F4, F5, F6, and F7 that are sent by the base stations 1, 2, 3, and 4, the additional features F4 and F5 that are sent by the base stations 1 and 2; combines the relative power (p4−p5) and the additional features F4 and F5 that are sent by the base stations 1 and 2 into a positioning array [(p4−p5), F4, F5] including the relative power (p4−p5); obtains, still according to the foregoing operations, a positioning array [(p4−p6), F4, F6] including the relative power (p4−p6), and a positioning array [(p5−p6), F5, F6] including a relative power (p5−p6); and combines the obtained positioning arrays [(p4−p5), F4, F5], [(p4−p6), F4, F6], and [(p5−p6), F5, F6] into a positioning array set V2 corresponding to the to-be-positioned terminal.

After the positioning array set corresponding to the to-be-positioned terminal is obtained by performing the operations in steps 309 and 310, the location information of the to-be-positioned terminal is obtained and the location information is sent to the to-be-positioned terminal, by performing operations in the following step 311.

Step 311: The positioning server determines, according to the positioning array set corresponding to the to-be-positioned terminal, location information corresponding to the to-be-positioned terminal, and sends the location information to the to-be-positioned terminal.

Specifically, the positioning server obtains, from the stored correspondence between a positioning array set and location information, all positioning array sets included in the correspondence, and separately calculates a similarity between the positioning array set corresponding to the to-be-positioned terminal and all the obtained positioning array sets, so as to determine a positioning array set with a maximum similarity; determines corresponding location information according to the positioning array set and from the correspondence between a positioning array set and location information, and determines the location information as the location information corresponding to the to-be-positioned terminal; and sends the location information to the to-be-positioned terminal according to the identity of the to-be-positioned terminal.

For example, the positioning server obtains, from the stored correspondence that is between a positioning array set and location information and that is shown in Table 1, positioning array sets V1 and V3 that are included in the correspondence, separately calculates similarities between a positioning array set V2 corresponding to the to-be-positioned terminal and the obtained positioning array sets V1 and V3; and when it is assumed that the similarity between the V2 and the V1 is 0.95, and the similarity between the V2 and the V3 is 0.5, determines that a positioning array set with a maximum similarity is V1, determines the corresponding location information (45, 50) according to the positioning array set V1 and from the correspondence that is between a positioning array set and location information and that is shown in Table 1, determines the location information (45, 50) as the location information corresponding to the to-be-positioned terminal, and sends the location information (45, 50) to the to-be-positioned terminal according to the identity phone1 of the to-be-positioned terminal.

In this embodiment of the present disclosure, signal features and an identity of a to-be-positioned terminal that are sent by all base stations in multiple base stations are received, where the signal feature of a base station includes a signal power and an additional feature, and the additional feature includes at least a base station identity of the base station and signal transmission time; a relative power set is determined according to signal powers sent by the multiple base stations, where the relative power set includes a relative power between any two base stations in the multiple base stations; and location information of a terminal corresponding to the identity of the to-be-positioned terminal is determined according to the relative power set and additional features sent by the multiple base stations. The relative power set is obtained according to the signal powers sent by the multiple base stations, and the location information of the to-be-positioned terminal is obtained according to the relative power set and the additional features sent by the multiple base stations. Therefore, obtaining location information by using a relative power avoids impact caused by different terminal transmit powers, and greatly reduces an error in the obtained location information.

Embodiment 4

Figure 4:
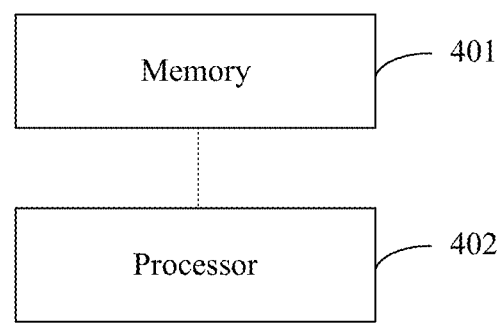
FIG. 4 is a schematic structural diagram of an apparatus for obtaining location information according to Embodiment 4 of the present disclosure.

Referring to FIG. 4, an embodiment of the present disclosure provides an apparatus for obtaining location information. The apparatus includes a memory 401 and a processor 402, and is configured to perform the following method for obtaining location information. The method includes:

receiving signal features and an identity of a to-be-positioned terminal that are sent by all base stations in multiple base stations, where the signal feature of a base station includes a signal power and an additional feature, and the additional feature includes at least a base station identity of the base station and signal transmission time;

determining a relative power set according to signal powers sent by the multiple base stations, where the relative power set includes a relative power between any two base stations in the multiple base stations; and determining, according to the relative power set and additional features sent by the multiple base stations, location information of a terminal corresponding to the identity of the to-be-positioned terminal.

The determining a relative power set according to signal powers sent by the multiple base stations includes:

calculating a difference between a signal power sent by a first base station and a signal power sent by a second base station, where the first base station is any base station in the multiple base stations, and the second base station is any base station other than the first base station in the multiple base stations; and determining the difference as a relative power between the first base station and the second base station, and adding the relative power to the relative power set.

The determining, according to the relative power set and additional features sent by the multiple base stations, location information of a terminal corresponding to the identity of the to-be-positioned terminal includes:

separately obtaining, according to the relative power set and the additional features sent by the multiple base stations, positioning arrays corresponding to all relative powers included in the relative power set, so as to form a positioning array set; and determining, according to the positioning array set and from a correspondence between a positioning array set and location information, the location information of the terminal corresponding to the identity of the to-be-positioned terminal.

The separately obtaining, according to the relative power set and the additional features sent by the multiple base stations, positioning arrays corresponding to all relative powers included in the relative power set includes:

determining two base stations corresponding to a first relative power, where the first relative power is any relative power included in the relative power set;

separately obtaining, from the additional features sent by the multiple base stations, additional features sent by the two base stations; and combining the first relative power and the additional features sent by the two base stations into a positioning array corresponding to the first relative power.

Further, before the receiving signal features and an identity of a to-be-positioned terminal that are sent by multiple base stations, the method further includes:

obtaining location information of a measured terminal;

receiving signal features sent by multiple base stations, where the signal feature includes a signal power and an additional feature, and the additional feature includes at least a base station identity and signal transmission time;

obtaining, according to the signal features sent by the multiple base stations, a positioning array set corresponding to the measured terminal; and storing the positioning array set and the location information of the measured terminal in a correspondence between a positioning array set and location information.

The obtaining, according to the signal features sent by the multiple base stations, a positioning array set corresponding to the measured terminal includes:

calculating a relative power between any two base stations in the multiple base stations according to signal powers sent by the multiple base stations, so as to form the relative power set; and separately obtaining, according to the relative power set and the additional features sent by the multiple base stations, positioning arrays corresponding to all relative powers included in the relative power set, so as to form the positioning array set corresponding to the measured terminal.

The additional feature further includes a signal-to-noise ratio.

The determining a relative power set according to signal powers sent by the multiple base stations includes:

selecting effective base stations from the multiple base stations according to signal-to-noise ratios included in the additional features sent by all the base stations in the multiple base stations; and calculating a relative power between any two effective base stations in the effective base stations according to signal powers sent by the effective base stations, so as to form the relative power set.

The selecting effective base stations from the multiple base stations according to signal-to-noise ratios included in the additional features sent by all the base stations in the multiple base stations includes:

separately comparing the signal-to-noise ratios sent by all the base stations in the multiple base stations with a preset threshold; and selecting base stations with signal-to-noise ratios greater than the preset threshold as the effective base stations.

The selecting effective base stations from the multiple base stations according to signal-to-noise ratios included in the additional features sent by all the base stations in the multiple base stations includes:

sorting the signal-to-noise ratios sent by all the base stations in the multiple base stations according to a preset order;

obtaining a preset quantity of maximum signal-to-noise ratios from all the sorted signal-to-noise ratios; and selecting, from the multiple base stations, base stations corresponding to the obtained signal-to-noise ratios as the effective base stations.

In this embodiment of the present disclosure, signal features and an identity of a to-be-positioned terminal that are sent by all base stations in multiple base stations are received, where the signal feature of a base station includes a signal power and an additional feature, and the additional feature includes at least a base station identity of the base station and signal transmission time; a relative power set is determined according to signal powers sent by the multiple base stations, where the relative power set includes a relative power between any two base stations in the multiple base stations; and location information of a terminal corresponding to the identity of the to-be-positioned terminal is determined according to the relative power set and additional features sent by the multiple base stations. The relative power set is obtained according to the signal powers sent by the multiple base stations, and the location information of the to-be-positioned terminal is obtained according to the relative power set and the additional features sent by the multiple base stations. Therefore, obtaining location information by using a relative power avoids impact caused by different terminal transmit powers, and greatly reduces an error in the obtained location information.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely examples of embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. An apparatus for obtaining location information, the apparatus comprising:
a receiver, configured to receive signal features and an identity of a to-be-positioned terminal that are sent by multiple base stations, wherein the signal feature of a base station comprises a signal power and additional features comprising a base station identity of the base station and a signal transmission time;
a processor, configured to:
determine a relative power set according to signal powers sent by the multiple base stations, wherein the relative power set comprises a relative power between any two base stations in the multiple base stations, and
determine, according to the relative power set and additional features sent by the multiple base stations, location information of a terminal corresponding to the identity of the to-be-positioned terminal.

2. The apparatus according to claim 1, wherein the processor is further configured to:
calculate a difference between a signal power sent by a first base station and a signal power sent by a second base station, wherein the first base station and second base station are base stations in the multiple base stations; and
determine the difference as a relative power between the first base station and the second base station, and add the relative power to the relative power set.

3. The apparatus according to claim 1, wherein the processor is further configured to:
separately obtain, according to the relative power set and the additional features sent by the multiple base stations, positioning arrays corresponding to all relative powers comprised in the relative power set, so as to form a positioning array set; and
determine, according to the positioning array set and from a correspondence between a positioning array set and location information, the location information of the terminal corresponding to the identity of the to-be-positioned terminal.

4. The apparatus according to claim 3, wherein the processor is further configured to:
determine two base stations corresponding to a first relative power, wherein the first relative power is any relative power comprised in the relative power set;
separately obtain, from the additional features sent by the multiple base stations, additional features sent by the two base stations; and
combine the first relative power and the additional features sent by the two base stations into a positioning array corresponding to the first relative power.

5. The apparatus according to claim 1, wherein the processor is further configured to:
obtain location information of a measured terminal;
obtain, according to the signal features sent by the multiple base stations, a positioning array set corresponding to the measured terminal; and
store, within a memory, the positioning array set and the location information of the measured terminal in a correspondence between a positioning array set and location information.

6. The apparatus according to claim 5, wherein the processor is further configured to:
calculate a relative power between any two base stations in the multiple base stations according to the signal powers sent by the multiple base stations, so as to form the relative power set; and
separately obtain, according to the relative power set and the additional features sent by the multiple base stations, positioning arrays corresponding to all relative powers comprised in the relative power set, so as to form the positioning array set corresponding to the measured terminal.

7. The apparatus according to claim 1, wherein:
the additional features further comprises a signal-to-noise ratio; and
the processor is further configured to:
select effective base stations from the multiple base stations according to signal-to-noise ratios comprised in the additional features sent by all the base stations in the multiple base stations, and
calculate a relative power between any two effective base stations in the effective base stations according to signal powers sent by the effective base stations, so as to form the relative power set.

8. The apparatus according to claim 7, wherein the processor is further configured to:
separately compare the signal-to-noise ratios sent by all the base stations in the multiple base stations with a preset threshold; and
select base stations with signal-to-noise ratios greater than the preset threshold as the effective base stations.

9. The apparatus according to claim 7, wherein the processor is further configured to:
sort the signal-to-noise ratios sent by all the base stations in the multiple base stations according to a preset order;
obtain a preset quantity of maximum signal-to-noise ratios from all the sorted signal-to-noise ratios; and
select, from the multiple base stations, base stations corresponding to the obtained signal-to-noise ratios as the effective base stations.

10. A method for obtaining location information, the method comprising:
receiving signal features and an identity of a to-be-positioned terminal that are sent by multiple base stations, wherein the signal features of a base station comprises a signal power and additional features comprising a base station identity of the base station and a signal transmission time;
determining a relative power set according to signal powers sent by the multiple base stations, wherein the relative power set comprises a relative power between any two base stations in the multiple base stations; and
determining, according to the relative power set and additional features sent by the multiple base stations, location information of a terminal corresponding to the identity of the to-be-positioned terminal.

11. The method according to claim 10, wherein determining a relative power set according to signal powers sent by the multiple base stations comprises:
calculating a difference between a signal power sent by a first base station and a signal power sent by a second base station, wherein the first base station is any base station in the multiple base stations, and the second base station is any base station other than the first base station in the multiple base stations; and
determining the difference as a relative power between the first base station and the second base station, and adding the relative power to the relative power set.

12. The method according to claim 10, wherein determining, according to the relative power set and additional features sent by the multiple base stations, location information of a terminal corresponding to the identity of the to-be-positioned terminal comprises:
separately obtaining, according to the relative power set and the additional features sent by the multiple base stations, positioning arrays corresponding to all relative powers comprised in the relative power set, so as to form a positioning array set; and
determining, according to the positioning array set and from a correspondence between a positioning array set and location information, the location information of the terminal corresponding to the identity of the to-be-positioned terminal.

13. The method according to claim 12, wherein separately obtaining, according to the relative power set and the additional features sent by the multiple base stations, positioning arrays corresponding to all relative powers comprised in the relative power set comprises:
determining two base stations corresponding to a first relative power, wherein the first relative power is any relative power comprised in the relative power set;
separately obtaining, from the additional features sent by the multiple base stations, additional features sent by the two base stations; and
combining the first relative power and the additional features sent by the two base stations into a positioning array corresponding to the first relative power.

14. The method according to claim 10, wherein before receiving signal features and an identity of a to-be-positioned terminal that are sent by multiple base stations, the method further comprises:
obtaining location information of a measured terminal;
receiving signal features sent by multiple base stations, wherein the signal features comprises a signal power and additional features comprising a base station identity and a signal transmission time;
obtaining, according to the signal features sent by the multiple base stations, a positioning array set corresponding to the measured terminal; and
storing the positioning array set and the location information of the measured terminal in a correspondence between a positioning array set and location information.

15. The method according to claim 14, wherein obtaining, according to the signal features sent by the multiple base stations, a positioning array set corresponding to the measured terminal comprises:
calculating a relative power between any two base stations in the multiple base stations according to signal powers sent by the multiple base stations, so as to form the relative power set; and
separately obtaining, according to the relative power set and the additional features sent by the multiple base stations, positioning arrays corresponding to all relative powers comprised in the relative power set, so as to form the positioning array set corresponding to the measured terminal.

16. The method according to claim 10, wherein:
the additional features further comprise a signal-to-noise ratio; and
determining a relative power set according to signal powers sent by the multiple base stations comprises:
selecting effective base stations from the multiple base stations according to signal-to-noise ratios comprised in the additional features sent by all the base stations in the multiple base stations, and
calculating a relative power between any two effective base stations in the effective base stations according to signal powers sent by the effective base stations, so as to form the relative power set.

17. The method according to claim 16, wherein selecting effective base stations from the multiple base stations according to signal-to-noise ratios comprised in the additional features sent by all the base stations in the multiple base stations comprises:

separately comparing the signal-to-noise ratios sent by all the base stations in the multiple base stations with a preset threshold; and selecting base stations with signal-to-noise ratios greater than the preset threshold as the effective base stations.

18. The method according to claim 16, wherein selecting effective base stations from the multiple base stations according to signal-to-noise ratios comprised in the additional features sent by all the base stations in the multiple base stations comprises:

sorting the signal-to-noise ratios sent by all the base stations in the multiple base stations according to a preset order;

obtaining a preset quantity of maximum signal-to-noise ratios from all the sorted signal-to-noise ratios; and selecting, from the multiple base stations, base stations corresponding to the obtained signal-to-noise ratios as the effective base stations.

\* \* \* \* \*